July 14, 1953

L. SASSE 2,645,707

TRIMMING BOARD WITH ILLUMINATED SCALE

Filed Aug. 15, 1952

INVENTOR.
LOUIS SASSE
BY
McMorrow, Berman & Davidson
ATTORNEYS

July 14, 1953
L. SASSE
2,645,707
TRIMMING BOARD WITH ILLUMINATED SCALE
Filed Aug. 15, 1952
2 Sheets—Sheet 2
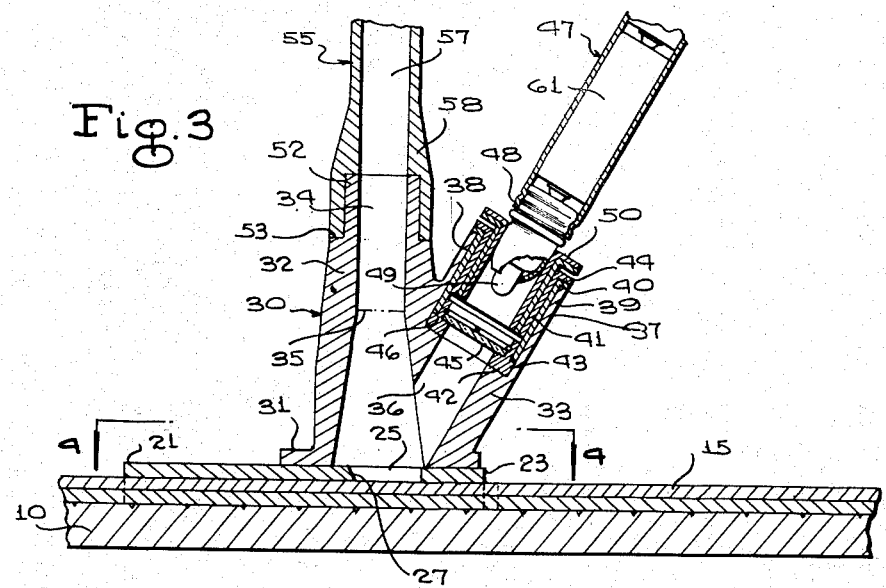
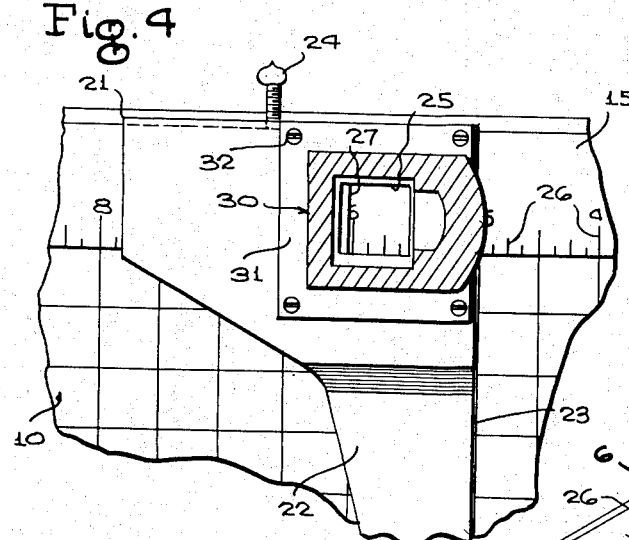
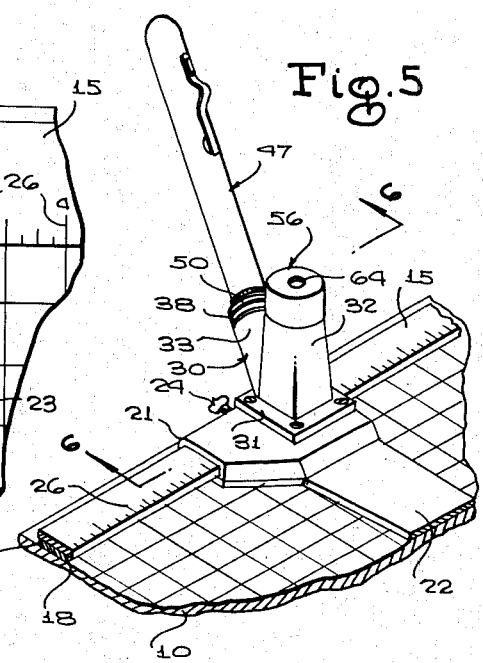
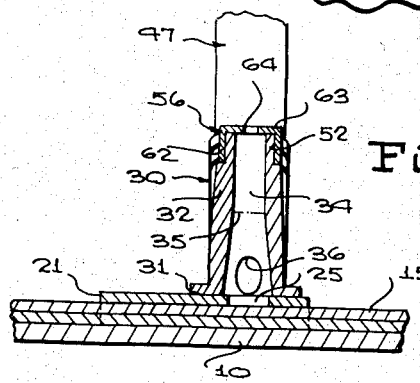
INVENTOR.
LOUIS SASSE
BY
McMorrow, Berman & Davidson
ATTORNEYS Patented July 14, 1953

2,645,707

UNITED STATES PATENT OFFICE 2,645,707

TRIMMING BOARD WITH ILLUMINATED SCALE

Louis Sasse, East Chicago, Ind.

Application August 15, 1952, Serial No. 304,497

6 Claims. (Cl. 240—6.4)

This invention relates to illuminated trimming boards and more particularly to a trimming board illuminated in a manner to render it suitable for use in a dark room to trim sensitized paper or film.

It is among the objects of the invention to provide on a trimming board improved illuminating means for lighting the measurement scale on the board; which filters the light to a color and intensity at which the light is not materially injurious to sensitized photographic film or paper; which shields and restricts the light to the ruler or lineal measurement scale of the board and eliminates any stray light which might injure the film or paper; which illuminates only a small portion of the scale at a time and is movable with the cutting guide along the scale; which utilizes a small commercial flashlight for the source of light; which has a viewing opening and light restricting eye pieces which can be mounted in the viewing opening to restrict the light emitted from the viewing opening and shield the surface of the trimming board from such emitted light; and which is simple and durable in construction, economical to manufacture, easy to install and use, and neat and attractive in appearance.

Other objects and advantages will become apparent from a consideration of the following description and the appended claims in conjunction with the accompanying drawings wherein:

Figure 3 is a fragmentary cross sectional view on an enlarged scale on the line 3—3 of Figure 2;

Figure 4 is a fragmentary cross sectional view on the line 4—4 of Figure 3;

Figure 5 is a perspective view of the illuminating device and a fragmentary portion of the trimming board with an eye piece different from the eye piece illustrated in Figure 1 mounted on the illuminating device; and Figure 6 is a fragmentary cross sectional view on the line 6—6 of Figure 5.

Figure 1:
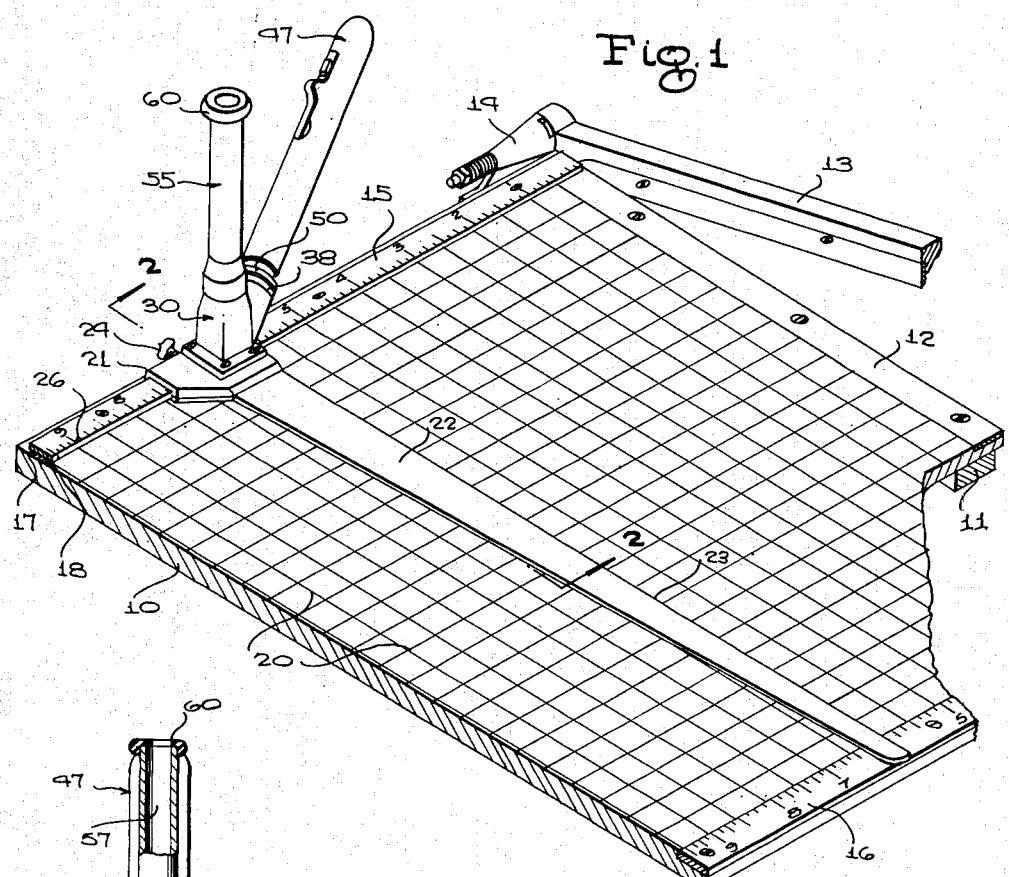
Figure 1 is a perspective view of a trimming board with a scale illuminating device illustrative of the invention operatively mounted thereon.
Figure 2:
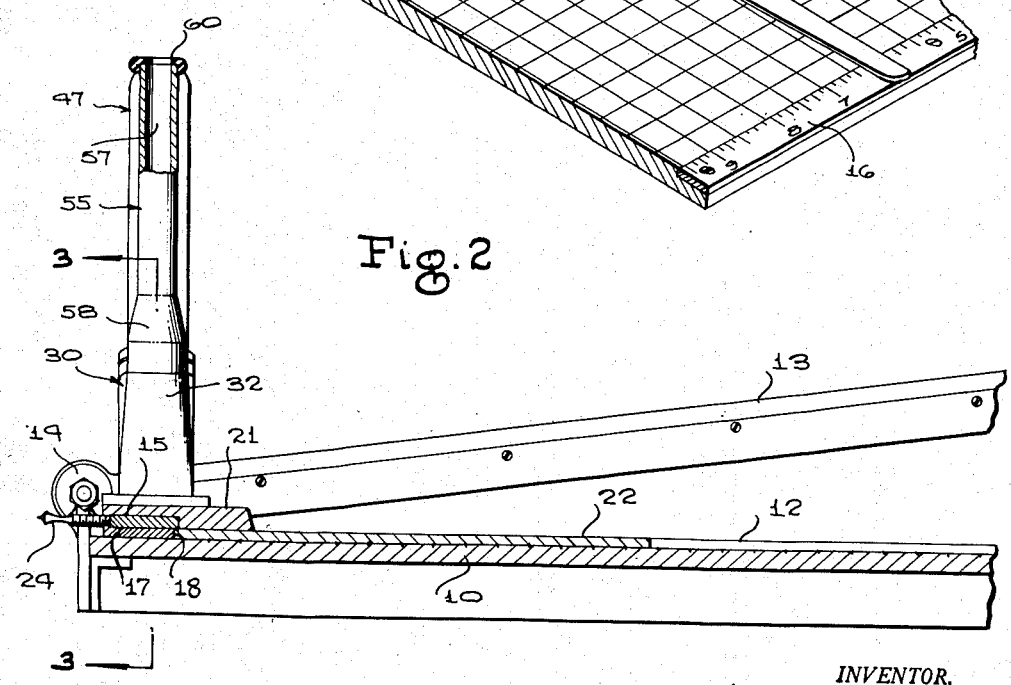
Figure 2 is a fragmentary cross sectional view on an enlarged scale on the line 2—2 of Figure 1.

With continued reference to the drawings, the trimming board comprises a flat plate 10 of rectangular shape and formed of a suitable substantially rigid material, such as wood, metal, synthetic resin plastic, or compressed fibre, and is adapted to rest flat on a horizontal supporting surface. A batten 11 is secured to the under surface of the board along one edge thereof to hold the adjacent edge of the board in a slightly raised condition relative to the supporting surface and a flat shear plate 12 of suitable metal is recessed into the upper surface of the board along the same edge as that along which the batten 11 extends, the upper or outer surface of the shear plate 12 being flush with the upper surface of the board and the outer edge of the shear plate being flush with the adjacent edge of the board 10. A trimming blade 13 is mounted at one end on the board 10 at one end of the shear plate 12 by a hinge mounting 14 and cooperates with the outer edge of the shear plate to cut a piece of sheet material, such as a piece of paper or photographic film placed on the board and projecting outwardly of the outer edge of the shear plate.

Bars or rulers 15 and 16 are disposed along the edges of the board 10 perpendicular to the shear plate 12 and both have scales of lineal measurement, such as inch scales, thereon. The bar 16 is recessed into the board, so that its upper surface is flush with the upper surface of the board, but the bar 15 projects above the upper surface of the board and is provided with under cut edges, as indicated at 17 and 18. The bar 15 may be a solid or unitary bar of T-cross sectional shape, or may be a composite bar, as illustrated, including an outer bar having straight and parallel side edges and a bar having a width less than the outer bar disposed between the outer bar and the adjacent surface of the board 10 with its side edges disposed inwardly of the corresponding side edges of the outer bar.

The upper surface of the board 10 is provided with markings 20, some of which extend between and are perpendicular to the bars 15 and 16, and the others of which are perpendicular to the marks or lines extending between the bars, the marks in each group being parallel to each other and spaced apart a predetermined distance, such as one-half an inch, to assist in locating and measuring sheet material on the board.

A slide 21 is mounted on the bar 15 for movement longitudinally of the bar and comprises a flat body of metal having an under cut groove extending longitudinally thereof and slidably receiving the bar 15 with inwardly directed flanges at the opposite sides of the groove fitting into the under cut sides of the bar to hold the slide on the bar. A straight edged guide blade or bar 22 is secured at one end to the slide 21 and projects from the slide over the upper surface of the board 10 with one edge 23 thereof perpendicular to the inner or adjacent edge of the bar 15. The slide 21 is provided with a locking screw 24 locking the slide at selected positions of adjustment along the bar 15 and is also provided with an opening 25, as shown in Figures 3 and 6, through which the scale 26 on the bar 15 is visible and which is provided at one side with a straight edge 27 suitably colored or coated to provide an indicating line cooperating with the scale 26 to indicate the location of the slide and guide bar 22 longitudinally of the ruler or scale bar 15.

The end of the slide 21 adjacent the straight edge 23 of the guide bar is preferably a straight continuation of the guide bar straight edge, so that this end of the slide can be used as the indicator when the trimming board is used in full light, and the indicating edge of the opening 25 is preferably disposed exactly one inch from the indicating front edge of the slide, so that the position of the straight edge of the guide bar can be immediately determined by subtracting one inch from the inch mark visible in the opening 25 and aligned with the indicating edge 27 of the opening.

Trimming boards of the character shown in the drawings and briefly described above are old and well known to the art and, as the trimming board itself constitutes no part of the present invention, except in the combination thereof with the illuminating means presently to be described, a more detailed description of the trimming board is considered unnecessary for the purposes of the present disclosure.

The illuminating device, generally indicated at 30, comprises a hollow metal body, one end of which is of rectangular shape and surrounded by an external flange 31. The flange 31 is disposed flat on the upper surface of the guide 21 and is provided at its corners with apertures receiving screws, as indicated at 32, which are threaded into tapped holes in the guide, and support the illuminating device firmly on the guide. The metal body includes two tubular sockets 32 and 33 of cylindrical shape which are joined together at the flanged end of the body and diverge in a direction away from the flanged end, so that the distal ends of the socket are spaced apart. The socket 32 is provided with a bore 34 which extends to the flanged end of the body and is tapered from the flanged end of the body to a location intermediate the length of the socket 32, as indicated at 35, the portion of the bore from the location 35 to the distal end of the socket 32 being of circular cross sectional shape and substantially uniform diameter. At its larger end, at the flanged end of the body, the bore 35 is of rectangular shape and surrounds the rectangular opening 25 in the guide 21.

The socket 33 is provided with a coaxial bore 36 which extends into the bore 34 at the flanged end of the body and which includes a counterbore 37 of larger diameter than the portion of the bore adjacent the flanged end of the body extending from a location intermediate the length of the socket 33 to the distal end of the socket.

A fitting 38 is slidably mounted in the counterbore 37 and includes a cylindrical sleeve 39 fitting the counterbore and having at one end an external annular flange 40 overlying the distal end of the socket 33. A cylindrical sleeve 41 is disposed within the sleeve 39 and provided at its end disposed inwardly of the socket 33 with a flanged ring 42 which provides annular shoulders disposed at the inner and outer sides of the sleeve 41 respectively, and rests on the internal annular shoulder 43 at the inner end of the counterbore 37. At its outer end the sleeve 41 is provided with an external annular flange 44 which overlies the flange 40 and the end of the sleeve 39 remote from the sleeve 40 rests on the shoulder provided by the flanged ring 42 externally of the sleeve 41. A light filter in the form of a colored glass disc 45 is disposed in the sleeve 41 and bears marginally against the shoulder provided by the flanged ring 42 internally of the sleeve 41, this filter being held in place in the sleeve 41 by a snap ring 46 seated in a groove in the inner surface of the sleeve at the side of the disc 45 remote from the flanged ring 42.

A pencil type flashlight 47 having at one end a bulb socket 48 in which a light bulb 49 is mounted has the socket portion 48 thereof inserted into the distal end of the socket 33, so that the light bulb 49 is disposed adjacent the light filter 45. If necessary, a cylindrical adapter 50 is disposed in the fitting 38 to receive the light emitting end of the flashlight 47. This adapter comprises cylindrical sleeves disposed one within the other, as many sleeves being used as are necessary to fit the interior of the fitting 38 and the exterior of the flashlight bulb socket 48.

The light from the flashlight bulb 49 passes through the light filter 45 to the scale 26 on the upper side of the scale bar 15 and is reflected from the upper surface of the scale bar upwardly through the bore 34 of the socket 32, so that the portion of the scale 26 within the opening 25 of the guide 21 can be viewed by looking downwardly through the bore 34 from the distal end of the socket 32 of the illuminating device 30.

The adapter 50 fits the light bulb to the fitting 58 and the filter fitting 58 fits the socket 33 so closely that no stray light escapes from the socket 33. The only light from the flashlight bulb which is visible is that which is reflected from the upper surface of the bar 15 upwardly through the bore 34 of the socket 32 of the body of the illuminating device.

The socket 32 is annularly recessed at its distal end to provide a cylindrical boss 52 of reduced diameter, and an annular external shoulder 53 at the inner end of the boss 52, and eye pieces, as generally indicated at 55 and 56, are selectively mountable on the boss 52 to extend upwardly from the distal end of the socket 32 to restrict the light emitted from the upper or distal end of this socket and shield the upper surface of the bore 10 from this emitted light.

The eye piece 55 is an elongated tubular body of cylindrical shape having a bore 57 extending longitudinally therethrough and having one end enlarged, as indicated at 58, and provided with a counterbore 59 which receives the boss 52, so that the corresponding end of the tubular eye piece rests upon the shoulder 53. When the eye piece 55 is used alone an annular buffer 60 of a resiliently elastic material, such as rubber, is mounted on the end of the eye piece remote from the socket 32 to protect the eye of a person using the device from injury when the device is used in the dark.

When the bulb 49 and battery 61 of the flashlight 47 are both new, so that the maximum amount of light is emitted from the flashlight, the eye pieces 55 and 56 may be used in combination to provide a maximum restriction of light emitted from the illuminating device. In this case, the rubber ring or buffer 60 is removed from the eye piece 55 and the eye piece 56 mounted on the corresponding end of the eye piece 55.

The eye piece 56 is a thin walled metal cap including a cylindrical side wall portion or flange 62 and a flat end wall 63 disposed at one end of the cylindrical flange 62 and provided with a centrally located aperture 64 of restricted size. When the two eye pieces are used in combination, the eye piece 56 is merely inserted on the eye piece 55 at the end of this eye piece remote from the socket 32 after the rubber ring 60 has been removed.

When the battery 61 has become partially exhausted, so that the light emitted from the light bulb 49 is of reduced intensity, the eye piece 55 may be removed and the eye piece 56 mounted directly on the boss 52 at the distal end of the socket 32, as illustrated in Figures 5 and 6. When the energy of the battery has been further depleted, so that the intensity of the light emitted from the device is not sufficient to endanger photographic film or paper, the use of the eye piece 56 may also be discontinued and the scale 26 viewed directly through the open distal end of the socket 32.

With the illuminating device 30 mounted on the slide 21 of the trimming board, the trimming board can be accurately set, even in total darkness, and photographic film can be removed from a pack, cut to size and restored to a pack without the necessity of having to interrupt the packing of the film to turn on the light each time the trimming board has to be reset. The illuminated trimming board can also be used to cut sensitized photographic paper to size from large sheets before the paper has been exposed and developed.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a trimming board having a flat bar mounted on and extending along one edge thereof and provided with under cut side edges, a flat slide slidably mounted on said bar for movement longitudinally thereof and having an opening therein, a guide blade secured at one end to said slide and extending therefrom over said board and substantially perpendicular to said bar, and a scale of lineal measurement on said bar visible through the opening in said slide, scale illuminating means comprising a hollow body mounted at one end on said slide in surrounding relationship to said opening and projecting from said slide in a direction away from said bar, said body including tubular sockets joined together at said one end of the body and diverging in a direction away from said bar with their distal ends spaced apart, a fitting mounted in the distal end of one of said sockets, a light filter in said fitting, and a flashlight mounted in said fitting and having a light emitting portion disposed adjacent said light filter, the distal end of the other of said sockets providing a sight opening for viewing the portion of said scale within the opening in said slide.

2. In combination with a trimming board having a flat bar mounted on and extending along one edge thereof and provided with under cut side edges, a flat side slidably mounted on said bar for movement longitudinally thereof and having an opening therein, a guide blade secured at one end to said slide and extending therefrom over said board and substantially perpendicular to said bar, and a scale of lineal measurement on said bar visible through the opening in said slide, scale illuminating means comprising a hollow body mounted at one end on said slide in surrounding relationship to said opening and projecting from said slide in a direction away from said bar, said body including tubular sockets joined together at said one end of the body and diverging in a direction away from said bar with their distal ends spaced apart, a fitting mounted in the distal end of one of said sockets, a light filter in said fitting, a flashlight mounted in said fitting and having a light emitting portion disposed adjacent said light filter, and an eye piece mounted on the other of said sockets at the distal end of the latter for restricting the amount of light emitted through the distal end of said other socket.

3. In combination with a trimming board having a flat bar mounted on and extending along one edge thereof and provided with under cut side edges, a flat slide slidably mounted on said bar for movement longitudinally thereof and having an opening therein, a guide blade secured at one end to said slide and extending therefrom over said board and substantially perpendicular to said bar, and a scale of lineal measurement on said bar visible through the opening in said slide, scale illuminating means comprising a hollow body mounted at one end on said slide in surrounding relationship to said opening and projecting from said slide in a direction away from said bar, said body including tubular sockets joined together at said one end of the body and diverging in a direction away from said bar with their distal ends spaced apart, a fitting mounted in the distal end of one of said sockets, a light filter in said fitting, a flashlight mounted in said fitting and having a light emitting portion disposed adjacent said light filter, and an eye piece mounted on the other of said sockets at the distal end of the latter for restricting the amount of light emitted through the distal end of said other socket, said eye piece comprising an elongated tubular body having a bore extending therethrough and a counterbore at one end thereof receiving the distal end portion of said other socket, and an annular buffer of resiliently elastic material mounted on said tubular body at the end of the latter remote from said other socket.

4. In combination with a trimming board having a flat bar mounted on and extending along one edge thereof and provided with under cut side edges, a flat slide slidably mounted on said bar for movement longitudinally thereof and having an opening therein, a guide blade secured at one end to said slide and extending therefrom over said board and substantially perpendicular to said bar, and a scale of lineal measurement on said bar visible through the opening in said slide, scale illuminating means comprising a hollow body mounted at one end on said slide in surrounding relationship to said opening and projecting from said slide in a direction away from said bar, said body including tubular sockets joined together at said one end of the body and diverging in a direction away from said bar with their distal ends spaced apart, a fitting mounted in the distal end of one of said sockets, a light filter in said fitting, a flashlight mounted in said fitting and having a light emitting portion disposed adjacent said light filter, and an eye piece mounted on the other of said sockets at the distal end of the latter for restricting the amount of light emitted through the distal end of said other socket, said eye piece comprising a thin walled cap having a cylindrical flange portion receiving the distal end portion of said other socket and an end wall at one end of said flange portion provided with a centrally located aperture of restricted area.

5. In combination with a trimming board having a flat bar mounted on and extending along one edge thereof and provided with under cut side edges, a flat slide slidably mounted on said bar for movement longitudinally thereof and having an opening therein, a guide blade secured at one end to said slide and extending therefrom over said board and substantially perpendicular to said bar, and a scale of lineal measurement on said bar visible through the opening in said slide, scale illuminating means comprising a hollow body mounted at one end on said slide in surrounding relationship to said opening and projecting from said slide in a direction away from said bar, said body including tubular sockets joined together at said one end of the body and diverging in a direction away from said bar with their distal ends spaced apart, a fitting mounted in the distal end of one of said sockets, a light filter in said fitting, a flashlight mounted at one end in said fitting having a light emitting portion disposed adjacent said light filter, and a cylindrical adapter disposed in said fitting and receiving the end of said flashlight mounted in said fitting, the distal end of the other of said sockets providing a sight opening for viewing the portion of said scale within the opening in said slide.

6. In combination with a trimming board having a flat bar mounted on and extending along one edge thereof and provided with under cut side edges, a flat slide slidably mounted on said bar for movement longitudinally thereof and having an opening therein, a guide blade secured at one end to said slide and extending therefrom over said board and substantially perpendicular to said bar, and a scale of lineal measurement on said bar visible through the opening in said slide, scale illuminating means comprising a hollow body mounted at one end on said slide in surrounding relationship to said opening and projecting from said slide in a direction away from said bar, said body including tubular sockets joined together at said one end of the body and diverging in a direction away from said bar with their distal ends spaced apart, a fitting mounted in the distal end of one of said sockets, a light filter in said fitting, and a flashlight mounted in said fitting and having a light emitting portion disposed adjacent said light filter, the distal end of the other of said sockets providing a sight opening for viewing the portion of said scale within the opening in said slide, said other socket having a bore extending longitudinally therethrough with its center line disposed substantially perpendicular to the plane of said one end of said body and said one socket having a bore extending longitudinally therethrough and intersecting the bore of said other socket at said one end of said body with its longitudinal center line disposed at an angle to the longitudinal center line of the bore in said one socket.

LOUIS SASSE.

References Cited in the file of this patent

UNITED STATES PATENTS

| Number | Name | Date |
|---|---|---|
| 1,500,482 | Barrett | July 8, 1924 |
| 2,380,267 | Ruth | July 10, 1945 |